Nov. 3, 1931.  R. H. WHITEHEAD ET AL  1,830,727
ELECTRIC MOTOR
Filed Oct. 1, 1929
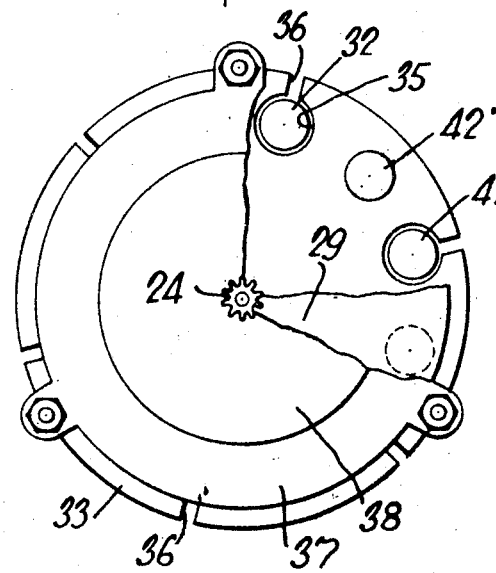
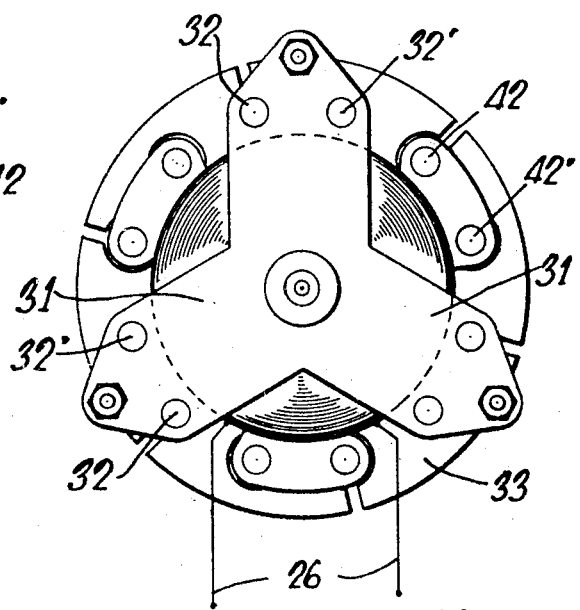
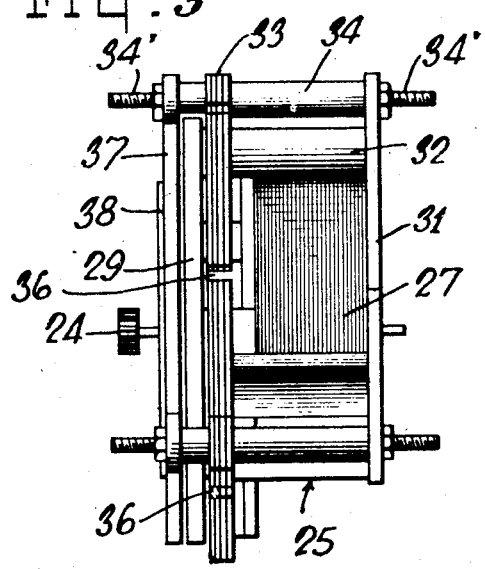
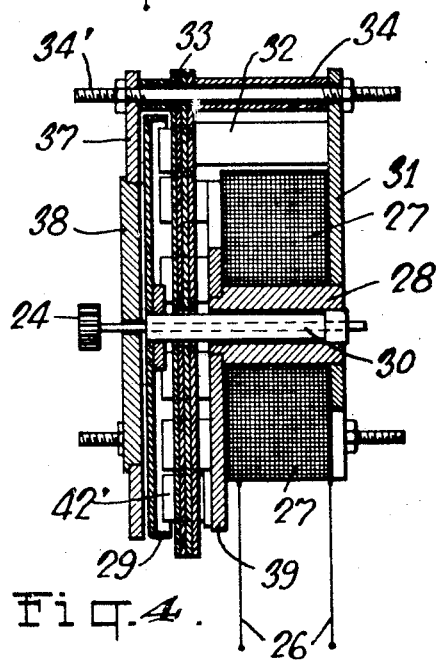
INVENTOR.
Richard H. Whitehead and
Wilson C. Porter
BY
Warfield & Watson
ATTORNEYS.

Patented Nov. 3, 1931

1,830,727

UNITED STATES PATENT OFFICE

RICHARD H. WHITEHEAD AND WILSON E. PORTER, OF NEW HAVEN, CONNECTICUT, ASSIGNORS TO THE NEW HAVEN CLOCK CO., OF NEW HAVEN, CONNECTICUT, A CORPORATION OF CONNECTICUT

ELECTRIC MOTOR

Application filed October 1, 1929. Serial No. 396,473.

This invention relates to electric motors and more particularly to small alternating current motors operating on the revolving field principle, such for example as the small motors designed to run electric clocks.

It is an object of this invention to provide a motor which will be simple and rugged in construction and efficient in operation.

It is a further object to provide a motor which may be caused to operate at slow speed.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Figure 1 is a front elevation of an electric motor embodying this invention.

Figures 2 and 3 are rear and side elevations respectively of the same motor and Figure 4 is a vertical section.

Many features of the invention are applicable to a wide variety of uses where a revolving field motor is required. A practical embodiment of this comprises an induction disk motor. This latter type is therefore herein chosen for illustration although it will be understood that the revolving field herein devised is applicable to any type of motor in which a revolving field may be utilized. The motor herein illustrated is intended particularly for operation from a commercial power line such for example as a 60 cycle 110 volt source.

In the drawings the numeral 26 designates lead-in conductors for supplying energy to a field winding 27 disposed about a central magnetic core 28. The magnetic circuit is branched in order to reduce the speed of the motor to a minimum. As illustrated, it is divided into three circuits in order to provide three sets of poles of like polarity, spaced between poles of opposite polarity, as will be hereinafter described.

These poles generate the rotating field between them and cooperate with the armature to produce the rotation of the latter. In the form illustrated the armature comprises a rotor disk 29 which is secured on a central drive shaft 30 journalled in the core 28 and having upon its outer end a pinion 24 by which it is adapted to be connected to the driven mechanism, as for example an electric clock.

The distribution of the magnetic circuits in the manner indicated, is accomplished by providing a pair of magnetic yokes or spiders 31 and 39, each of which has three arms. Each yoke is secured to the core 28 and is arranged to serve as a supporting plate for the exciting winding 27. The yoke 31 is upon the rear and the yoke 39 upon the front of the coil. At the ends of each arm of the yoke 31 and beyond the winding 27 is disposed a pair of magnetic pole members 32 and 32' which extend upwardly closely adjacent to the underside of the rotor disk 29 which as will be understood is of a conducting material as copper. As shown, this disk is provided with a flange or rim at its outer edge. At the ends of the yoke 39 are arranged a second set of upstanding pole pieces 42 and 42' similar in construction to the pole pieces 32 and 32'.

In order that one of each pair of these pole members, for example, that at 32' or 42', may operate as a shaded pole for supplying magnetic flux with a lagging component, shading coils are associated therewith in the form of one or more conducting disks 33 arranged to encircle the flux of certain poles being between the rotor disk 29 and the top of the field winding 27. Such disks are shown as rigidly supported in place by means of spacing columns 34 secured on the tips of each of the arms of the yoke 31. In order that these disks shall shade mainly the pole components at 32' and 42' and not those at 32 and 42, the openings in the disk intended to receive the pole pieces 32 and 42 may be cut quite large and preferably have slots cut through their outer edges to the outside as shown at 36, whereby eddy-currents are prevented from circulating about the pole members 32 and 42. The openings to receive the pole pieces 32' and 42' are cut to fit snugly about the pole pieces.

Means are provided to complete the magnetic path to induce the lines of force to pass across the path of the conductors from each pole to the next pole of opposite polarity. Where, as here illustrated, the rotor is constructed as a conducting disk without iron, this return path may comprise a stationary disk or ring of iron 37 on the opposite side of the disk from the pole pieces. This is here illustrated as stationary and supported by the columns 34. The central portion 38 of the ring 37 may be of brass.

With this construction it will be seen that the pairs of pole pieces of the front spider alternate with those of the rear spider, and one pole of each pair has its flux shifted by the shading coil. These shaded poles are alternated with the normal poles. This results in a flow of magnetism which shifts during the cycle from the unshaded pole to the shaded pole and then to the next unshaded pole. This creates a rotating field having a speed 1/3 synchronism. It provides, moreover, localized pole pieces which may be employed in any manner well known to the art.

It will be obvious that with this motor as with all motors of the revolving field type, the speed of rotation of the field is a fixed quantity depending upon the frequency. Where this field is utilized with an induction type rotor, there is introduced, however, an element of slip according to well known principles.

A motor of this type is rigid, compact and reliable.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces.

2. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces, two pole pieces constituting a pair being provided for each spider arm and phase shifting means associated with one pole of each pair.

3. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in the direction away from the coil and rear spider, rear spider pole pieces for the arms of the rear spider situated in a plane with the first mentioned pole pieces, said plane being in front of said coil, and magnetic connections between the rear spider arms and the rear spider pole pieces, two pole pieces constituting a pair, being provided for each spider arm and phase shifting means associated with one pole of each pair comprising a conducting disk concentric with the coil and closely embracing and surrounding said pole pieces on each pair.

4. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces, a shaft journalled in said core an electric conductor carried by said shaft to move past said pole pieces as the shaft rotates, and magnetic material on the opposite side of said conductor for completing the magnetic path.

5. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces, two pole pieces constituting a pair being provided for each spider arm and phase shifting means associated with one pole of each pair, a shaft journalled by said core, an electric conductor carried by said shaft to move past said pole pieces as the shaft rotates and magnetic material on the opposite side of said conductor for completing the magnetic path.

6. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in the direction away from the coil and rear spider, rear spider pole pieces for the arms of the rear spider situated in a plane with the first mentioned pole pieces, said plane being in front of said coil, and magnetic connections between the rear spider arms and the rear spider pole pieces, two pole pieces constituting a pair being provided for each spider arm, and phase shifting means associated with one pole of each pair comprising a conducting disk concentric with the coil and closely embracing and surrounding said pole pieces on each pair, a shaft journalled in said core, an electric conductor carried by said shaft to move past said pole pieces as the shaft rotates and magnetic material on the opposite side of said conductor for completing the magnetic path.

7. In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces, two pole pieces constituting a pair being provided for each spider arm and phase shifting means associated with one pole of each pair, a shaft journalled coaxially with said core, a conducting disk carried by said shaft adjacent to said pole pieces and magnetic material on the opposite side of said disk from said pole pieces to constitute a return path.

8. In an electric motor in combination a plurality of pole pieces symmetrically disposed in a plane about an axis, an electric coil disposed out of the plane of said pole pieces and having a core therein, said pole pieces extending in a direction away from said coil, arms forming spiders connecting said pole pieces with the magnetic poles of said core and connecting certain of said pole pieces with one of the magnetic poles of said core and connecting intermediate pole pieces with the other magnetic pole of said core and means for changing the phase of the magnetic flux in certain of said pole pieces.

9. An electric motor stator having a plurality of pairs of poles symmetrically disposed about an axis, a copper ring disposed about said axis and closely embracing one pole of each pair to hold said pairs in proper spaced relation and to effect a phase displacement in said poles.

10. An electric motor stator having a plurality of pairs of poles symmetrically disposed about an axis, a copper ring disposed about said axis and embracing all of said poles, said ring being slotted to open the circuit about some of said poles whereby the ring retains said poles in position and also effects phase displacement in certain of said poles.

In testimony whereof we affix our signatures.

RICHARD H. WHITEHEAD.
WILSON E. PORTER.

DISCLAIMER

1,830,727.—*Richard H. Whitehead* and *Wilson E. Porter*, New Haven, Conn. ELECTRIC MOTOR. Patent dated November 3, 1931. Disclaimer filed November 14, 1933, by the assignee, *New Haven Clock Company*.

Hereby enters this disclaimer to that part of the claim in said specification, which is in the following words, to wit:

In an electric motor in combination, a central magnetic core, a field coil surrounding said core, a magnetic spider in front of said coil and a magnetic spider in back of said coil, each of said spiders being connected to said core, the arms of said front spider alternating with the arms of the rear spider, pole pieces on the arms of the front spider extending in a direction away from the coil and rear spider, rear spider pole pieces for the arms of the rear spider situated in a plane with the first mentioned pole pieces, said plane being in front of said coil, and magnetic connections between the rear spider arms and the rear spider pole pieces.

In an electric motor in combination a plurality of pole pieces symmetrically disposed in a plane about an axis, an electric coil disposed out of the plane of said pole pieces and having a core therein, said pole pieces extending in a direction away from said coil, arms forming spiders connecting said pole pieces with the magnetic poles of said core and connecting certain of said pole pieces with one of the magnetic poles of said core and connecting intermediate pole pieces with the other magnetic pole of said core and means for changing the phase of the magnetic flux in certain of said pole pieces.

[*Official Gazette December 12, 1933.*]